United States Patent [19]
Tsuchiya et al.

[11] Patent Number: 5,951,104
[45] Date of Patent: Sep. 14, 1999

[54] SEAT SYSTEM FOR VEHICLE

[75] Inventors: Satoru Tsuchiya; Nobuhiro Uekita, both of Wako, Japan

[73] Assignee: Honda Giken Kogyo Kabushiki Kaisha, Tokyo, Japan

[21] Appl. No.: 08/966,859

[22] Filed: Nov. 10, 1997

[30] Foreign Application Priority Data

Nov. 12, 1996 [JP] Japan .................................. 8-300278

[51] Int. Cl.⁶ ...................................................... B60N 2/00
[52] U.S. Cl. ...................... 297/316; 296/65.09; 297/362; 297/335
[58] Field of Search .................................. 297/316, 335, 297/331, 362, 344.1, 374, 376, 354.13, 340; 296/69, 65.09, 65.13

[56] References Cited

U.S. PATENT DOCUMENTS

| | | | |
|---|---|---|---|
| 4,395,011 | 7/1983 | Torta .................................... | 297/335 X |
| 4,641,884 | 2/1987 | Miyashita et al. ................... | 297/362 X |
| 5,280,987 | 1/1994 | Miller ................................. | 296/65.13 X |
| 5,364,151 | 11/1994 | Yurasits ................................. | 296/69 X |
| 5,605,368 | 2/1997 | Norma et al. ...................... | 296/65.13 X |
| 5,662,368 | 9/1997 | Ito et al. ............................ | 296/65.09 X |
| 5,711,505 | 1/1998 | Nemoto ................................ | 297/331 X |
| 5,755,491 | 5/1998 | Baloche et al. ......................... | 297/362 |
| 5,800,015 | 9/1998 | Tsuchiya et al. ........................ | 297/331 |

FOREIGN PATENT DOCUMENTS

7-172223  7/1995  Japan .

*Primary Examiner*—Peter M. Cuomo
*Assistant Examiner*—Stephen Vu
*Attorney, Agent, or Firm*—Nikaido, Marmelstein, Murray & Oram LLP

[57] ABSTRACT

A seat system for a vehicle, is provided which includes a seat which has a seat cushion and a seat back and which is disposed within a vehicle passenger compartment, wherein the seat can be used for multipurposes. A pair of seat supporting frames disposed on opposite sides of the seat are connected at one end thereof to a pair of slide members capable of being moved along guide rails, so that the frames can be tilted around a first shaft extending in a widthwise direction of the vehicle and their tilted positions can be fixed. The seat cushion and the seat back are supported at the other ends of the seat supporting frames, so that they can be relatively turned around a second shaft parallel to the first shaft and their relative turned positions can be fixed.

7 Claims, 9 Drawing Sheets

SEAT SYSTEM FOR VEHICLE

BACKGROUND OF THE INVENTION

1. Field of the Invention

The present invention relates to a seat system for a vehicle, including a seat which includes a seat cushion and a seat back and which is disposed within a vehicle passenger compartment, and in particular, to a seat system for a vehicle, in which the seat can be used for multipurposes.

2. Description of the Prior Art

A seat system including a seat capable of being used for multipurposes, is conventionally known, for example, from Japanese Patent Application Laid-open No. 7-172223 and the like.

In the known seat system, a seat cushion and a seat back are individually, tiltably, supported on a seat leg for sliding movement along guide rails mounted on a floor surface within a vehicle passenger compartment. In such a construction, the orientation of the seat can be selectively switched between an opposite seating state, a folded state and a full-flat state for use for multipurposes, but the known seat system is accompanied by the following disadvantages for further multipurpose use:

(1) If the seat is folded, the seat cushion and the seat back are brought into mutually opposed states, and the total thickness of the seat cushion and the seat back in the states is relatively large. For this reason, the unoccupied space can not be ensured to the maximum within the vehicle passenger compartment.

(2) Even if the seat is brought into its full-flat state, the seat leg exists below the seat and hence, it is difficult to realize a full-flat orientation in close proximity to the floor surface.

(3) The height of the seat cannot be adjusted, and hence the seat cannot be brought into a seating orientation adapted for the physique of an occupant.

(4) The back surface of the seat cannot be effectively utilized.

SUMMARY OF THE INVENTION

The present invention has been accomplished with such circumstances in view, and it is an object of the present invention to provide a seat system for a vehicle, wherein the above-described disadvantages have been overcome, and the seat can be used for multipurposes.

To achieve the above object of the present invention, there is provided a seat system for a vehicle, comprising a seat which includes a seat cushion and a seat back and which is disposed within a vehicle passenger compartment, the seat system further including guide rails mounted on a floor surface within the vehicle passenger compartment to extend longitudinally of the vehicle, and a pair of seat supporting frames which are disposed on opposite sides of the seat, in a widthwise direction and connected at one end thereof to a pair of slide members, so that the seat supporting frames can be tilted around a first shaft extending in the widthwise direction of the vehicle and their tilted positions can be fixed, and the slide members are capable of being moved along the guide rails and fixed at any position along the guide rails. The seat cushion and the seat back are supported at the other ends of the seat supporting frames, so that they can be turned or rotated relative to each other around a second shaft parallel to the first shaft and their relative turned positions can be fixed.

With such arrangement of a first aspect of the present invention, the position of the seat in the longitudinal direction within the compartment can be determined at any point by moving the slide members along the guide rails. In addition, the height position of the seat can be adjusted by tilting the seat supporting frames about the axis of the first shaft, whereby the seat can be brought into a seating orientation adapted for the physique of an occupant. Further, by turning the seat cushion and the seat back about the axis of the second shaft relative to each other, the seat cushion and the seat back can be brought into connected orientations which are seating orientations, or into orientations in which they are connected in the same plane. The opposite front and rear surfaces of the seat cushion and the seat back can be effectively utilized, and the seat can be moved to ensure a relatively wide unoccupied space within the compartment. By combining this movement with the tilting of the seat supporting frames, the seat can be brought into a full-flat state in close proximity to the floor surface. In this manner, the seat can be adjusted to any height adapted for multipurposes.

According to another feature of the present invention, a supporting frame tilted-position adjusting means is provided between one end of one of the seat supporting frames and one of the slide members and adapted to adjustably fix the tilted position of the one seat supporting frame about the axis of the first shaft. A seat turned-position adjusting means is provided at the other end of the one seat supporting frame and adapted to adjustably fix the turned position of the seat with the relative positions of the seat cushion and the seat back maintained constant, about the axis of the second shaft. Therefore, the adjustment of the height position of the seat by the tilting movement of the seat supporting frames can be easily performed by the supporting frame tilted-position adjusting means. In addition, the orientation of the seat can be changed with the relative positions of the seat cushion and the seat back maintained constant, by the seat turned-position adjusting means and for example, the orientation of the seat can be easily changed from the forward-turned state to the opposite seating orientation.

According to a further feature of the present invention, the pair of slide members are integrally connected to each other through a connection. Therefore, the slide members, i.e., the seat supporting frames can be smoothly moved along the guide rails.

According to another feature of the present invention, the front and rear surfaces of each of the seat cushion and the seat back, are formed of different materials. Therefore, the rear surface of the seat can be effectively utilized for a purpose other than seating, for example, as a table or the like.

According to still another feature of the present invention, the seat cushion and the seat back have substantially the same structure and shape. Therefore, even if the seat is brought into the opposite seating orientation, an occupant can sit on the seat without a sense of incompatibility, and the seat can be effectively utilized as a full-flat bed or table.

According to a further aspect of the present invention, there is provided a seat system for a vehicle, comprising a seat which includes a seat cushion and a seat back and which is disposed within a vehicle passenger compartment. The seat system includes guide rails mounted on a floor surface within the vehicle passenger compartment to extend longitudinally of the vehicle, and a pair of seat supporting frames which are disposed on opposite sides of the seat in a widthwise direction, are connected at one end thereof to a pair of slide members, so that they can be tilted around a first shaft extending in the widthwise direction of the vehicle and their tilted positions can be fixed. The slide members are capable of being moved along the guide rails and fixed at any position along the guide rails, and the seat cushion and the seat back are supported at the other ends of the seat supporting frames, so that they can be turned relative to each other around a second shaft parallel to the first shaft and their turned positions can be fixed. A first rotary wheel which is turned about the axis of the first shaft, is switchably fixed to one of the slide members, and a second rotary wheel is supported on one of the seat supporting frames for turning movement about the axis of the second shaft with the seat cushion and the seat back brought into engagement therewith. The first and second rotary wheels are connected to each other through an endless transmitting band which is capable of rotating the second rotary wheel with the orientations of the seat cushion and the seat back maintained constant relative to the floor surface, in response to the tilting movement of the one seat supporting frame when the first rotary wheel is in its fixed state to the one slide member.

With this feature, a function similar to that of the first aspect of the present invention can be achieved and moreover, the orientation of the seat relative to the floor surface can be maintained constant during the tilting movement of the seat supporting frames, and the adjustment of the height of the seat can be performed while maintaining the orientation of the seat relative to the floor surface, wherein the operation is easy in the adjustment of the height.

DETAILED DESCRIPTION OF THE PREFERRED EMBODIMENTS

Figure 1:
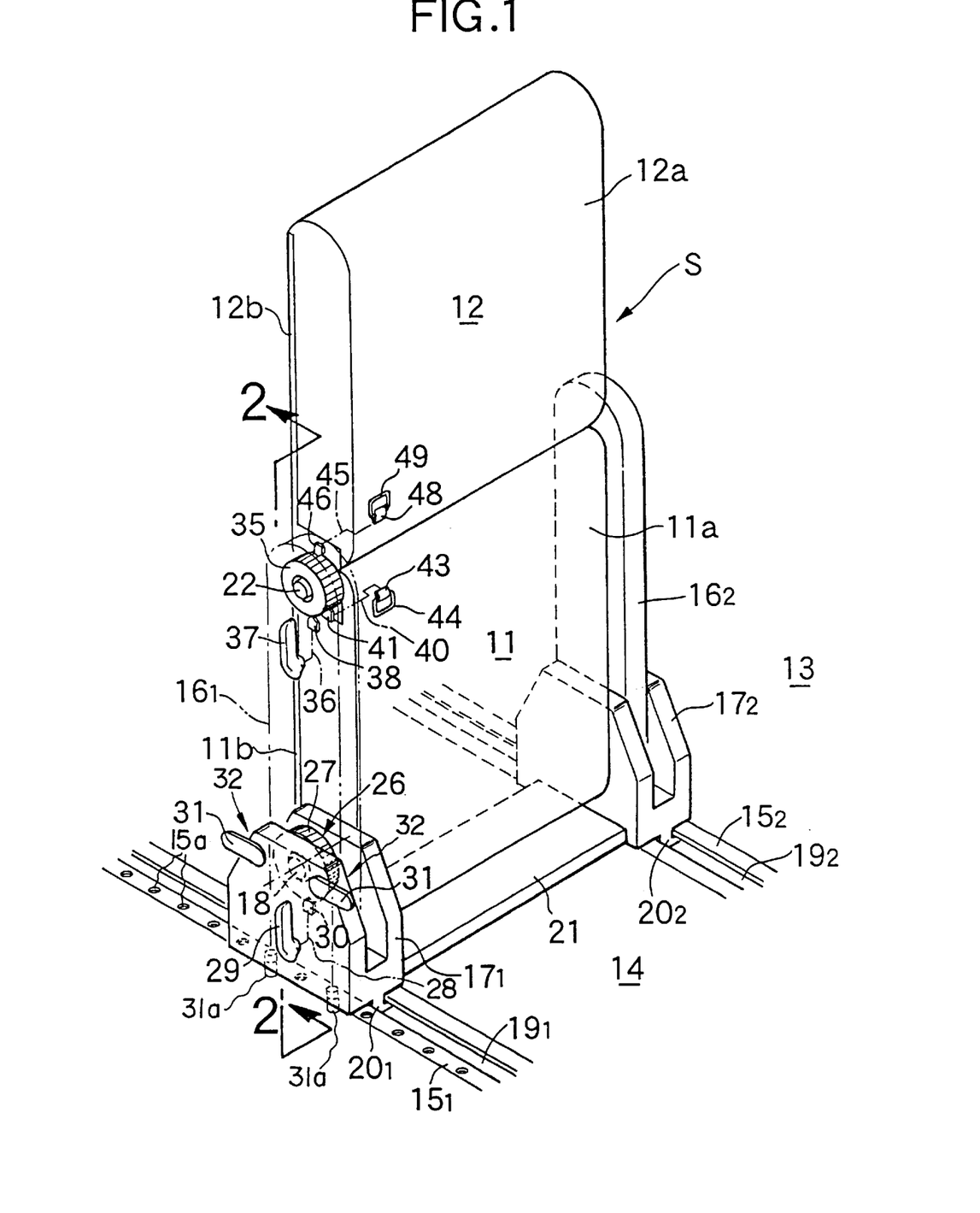
FIG. 1 is a perspective view of a seat system for a vehicle according to a first embodiment of the present invention.
Figure 2:
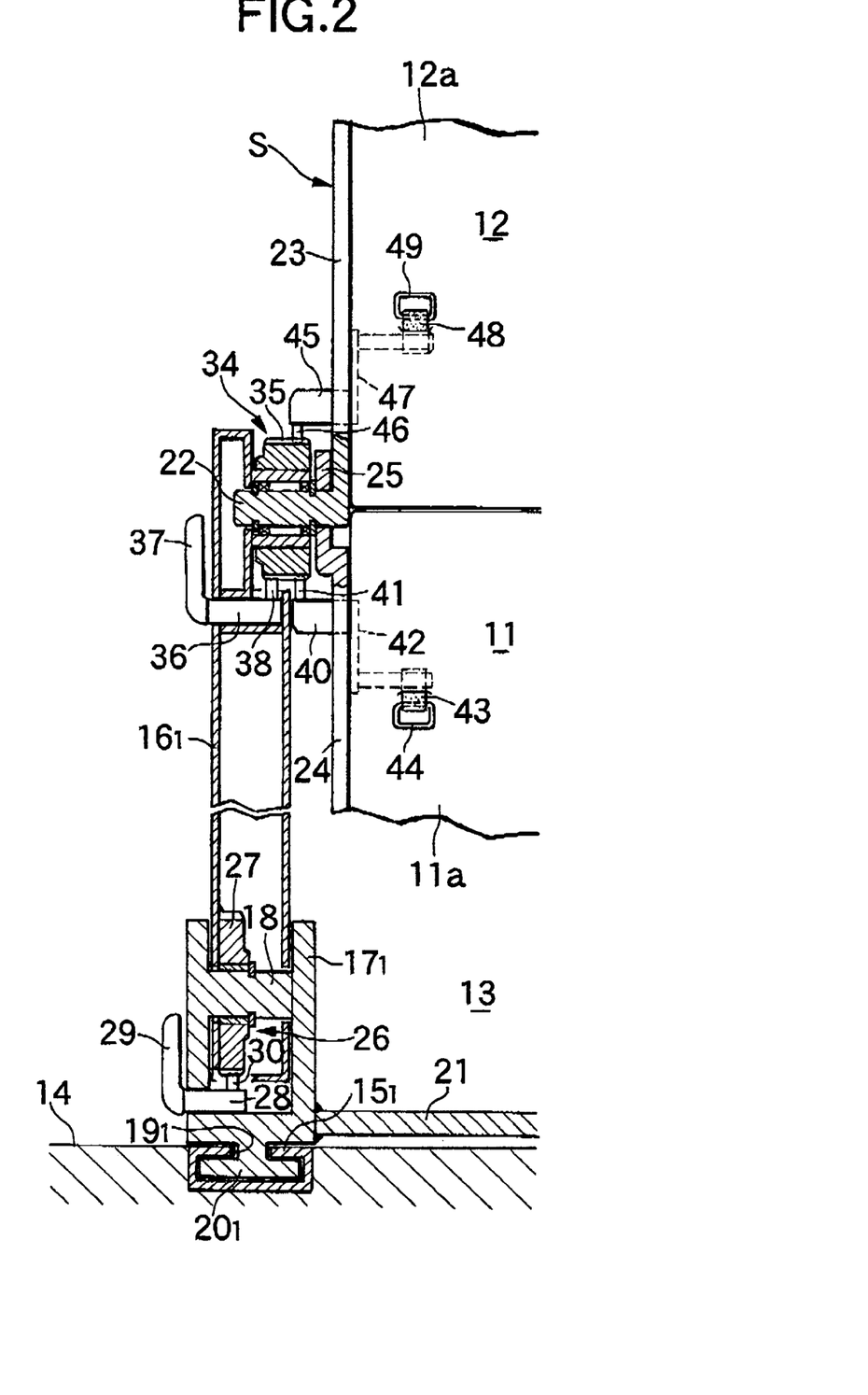
FIG. 2 is a sectional view taken along a line 2—2 in FIG. 1.
Figure 3A:
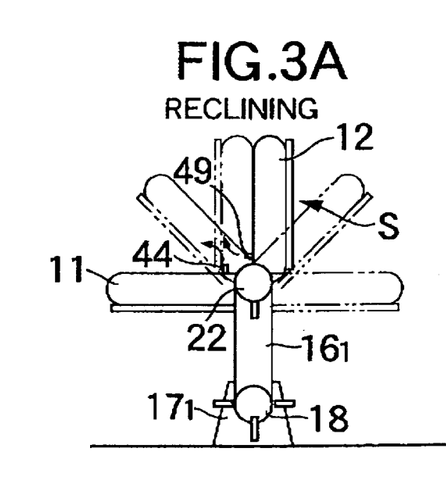
FIG. 3A–3D are illustrations for explaining the reclining, rotation, height-adjustment and parallel-displacement of a seat.
Figure 3B:
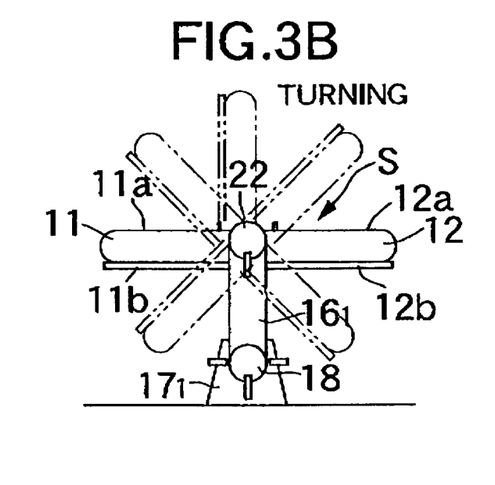
Figure 3C:
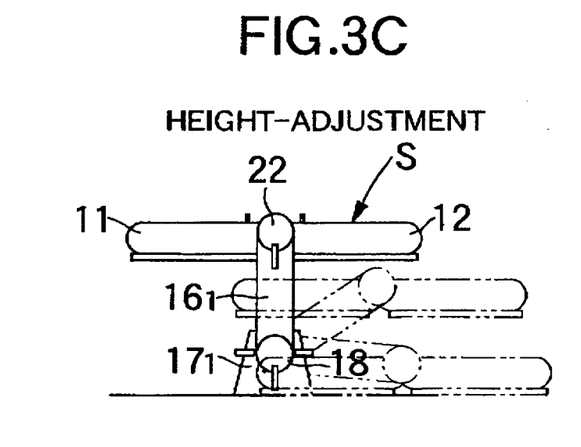
Figure 3D:
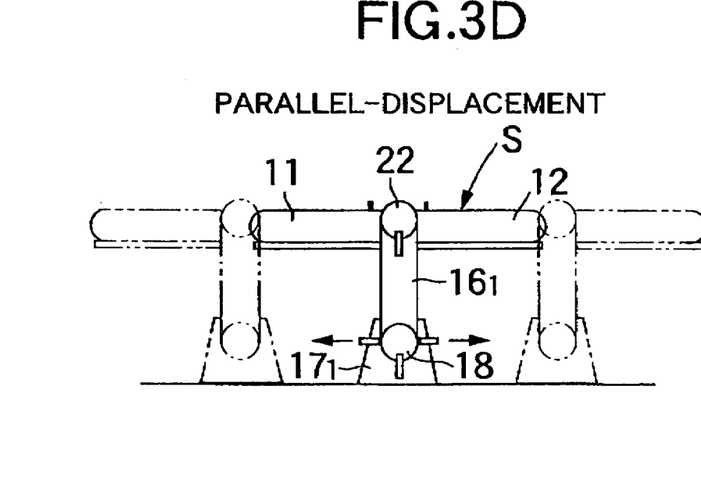

Referring first to FIGS. 1 and 2, a seat S includes a seat cushion 11 and a seat back 12. The seat cushion 11 and the seat back 12 have substantially the same structure and shape. Moreover, front surfaces 11$a$ and 12$a$ and rear surfaces 11$b$ and 12$b$ of the seat cushion 11 and the seat back 12 are formed of different materials, respectively. The front surfaces 11$a$ and 12$a$ are formed of a cushion material, while the rear surfaces 11$b$ and 12$b$ are formed of a flat plate material.

A pair of guide rails $15_1$ and $15_2$ extending in a longitudinal direction of the vehicle at locations corresponding to opposite sides of the seat S are provided on a floor surface 14 in a vehicle passenger compartment 13 having the seat S disposed therein, for example, so that they are flush with the floor surface 14. The seat S is movable in the longitudinal direction of the vehicle along the guide rails $15_1$ and $15_2$.

A pair of seat supporting frames $16_1$ and $16_2$ are disposed on opposite sides of the seat S in a widthwise direction, and are longitudinally, movably connected at their one end (lower ends in FIGS. 1 and 2) to slide members $17_1$ and $17_2$ through first shafts 18 having axes extending in a widthwise direction of the vehicle. The slide members $17_1$ and $17_2$ are formed in a substantially U-shape, opened upwards, for example, so as to sandwich the one end of the seat supporting frames $16_1$ and $16_2$ from opposite sides. The first shafts 18 are integrally formed on the slide members $17_1$ and $17_2$ to pass through the one end of the seat supporting frames $16_1$ and $16_2$. Dovetail grooves $19_1$ and $19_2$ are provided in the guide rails $15_1$ and $15_2$, and substantially T-shaped fit portions $20_1$ and $20_2$ integrally provided on bottoms of the slide members $17_1$ and $17_2$, are slidably fitted into the dovetail grooves $19_1$ and $19_2$. Therefore, both the slide members $17_1$ and $17_2$ and the seat supporting frames $16_1$ and $16_2$ are slidable along the guide rails $15_1$ and $15_2$. Moreover, both the slide members $17_1$ and $17_2$ are interconnected through a connector 21 disposed slightly above the floor surface 14, so that both the slide members $17_1$ and $17_2$ and thus both the seat supporting frames $16_1$ and $16_2$ are simultaneously moved along the guide rails $15_1$ and $15_2$. The connector 21 can be disposed at a location below the floor surface 14.

The seat cushion 11 and the seat back 12 are turnably or rotatably supported relative to each other at the other ends (upper ends in FIGS. 1 and 2) of the seat supporting frames $16_1$ and $16_2$ through second shafts 22 having axes parallel to the first shafts 18.

The second shafts 22 are integrally provided on a frame 23 of the seat back 12, for example, and are supported at the other ends of the seat supporting frames $16_1$ and $16_2$ for rotation about their axes. Therefore, the seat back 12 is turnably supported at the other ends of the seat supporting frames $16_1$ and $16_2$ for turning movements about the axes of the second shafts 22. Support plate portions 25 integrally provided on a frame 24 of the seat cushion 11 are relatively, turnably supported on the second shafts 22, and the seat cushion 11 is supported at the other ends of the seat supporting frames $16_1$ and $16_2$ for turning movement relative to the seat back 11 about the axes of the second shafts 22.

A supporting frame tilt-position adjusting means 26 is mounted between one end of the seat supporting frames $16_1$ and $16_2$ and the slide members $17_1$ and $17_2$ for adjustably fixing the tilt position of the seat supporting frame $16_1$ tilted about the axis of the first shaft 18. The supporting frame tilt-position adjusting means 26 includes a stationary gear 27 secured to the seat supporting frame $16_1$ coaxially with the first shaft 18, and a first lock mechanism 28 mounted on the slide member $17_1$ so that it can be switchably meshed and disengaged from the stationary gear 27. The first lock mechanism 28 includes an operating lever 29 turnably disposed outside the slide member $17_1$, and an engage claw 30 which is operated in response to the turning operation of the operating lever 29 between a position in which it is meshed with the stationary gear 27, and a position in which it is disengaged from the stationary gear 27. In a state in which the engage claw 30 has been meshed with the stationary gear 27, the tilt-position of the seat supporting frame $16_1$ is fixedly maintained. In response to releasing of the meshing of the engage claw 30 with the stationary gear 27, the seat supporting frame $16_1$ can be tilted about the first shaft 18.

A fixing means is mounted between the slide member $17_1$ and the guide rail $15_1$ for fixing the slide member $17_1$ at any location along the guide rail $15_1$. These fixing means 32, 32 are provided on the slide member $17_1$ in such a manner that engagement pins 31a, 31a, which are engagable with a plurality of engagement holes 15a, 15a formed on the guide rail $15_1$, are each operated to move between a position coming into engagement with one of the holes 15a, and a position releasing the engagement, in accordance with the operation of respective operating levers 31 that are disposed on an outer side of the slide member $17_1$.

A seat turn-position adjusting means 34 is mounted at the other end of the one seat supporting frame $16_1$ for adjustably fixing the position of seat S about the axis of the second shaft 22, in a state in which the relative positions of the seat cushion 11 and the seat back 12 are kept constant. The seat turn-position adjusting means 34 includes an upper gear 35 supported on the seat supporting frame $16_1$ for turning movement about the axis of the second shaft 22 to be able to fix the seat cushion 11 and the seat back 12 in an engaged manner, and a second lock mechanism 36 mounted on the seat supporting frame $16_1$, such that it can be switched between meshed and disengaged from the upper gear 35. The second lock mechanism 36 includes an operating lever 37 turnably disposed outside the seat supporting frame $16_1$, and an engage claw 38 which is operated in response to the turning operation of the operating lever 37 between a position in which it is meshed with the upper gear 35, and a position in which it is disengaged from the upper gear 35. In a state in which the engage claw 38 has been meshed with the upper gear 35 wherein the seat cushion 11 and the seat back 12 have been fixed in the engaged manner, the position of seat S about the second shafts 22 with the relative positions of the seat cushion 11 and the seat back 12 being fixed, is fixedly maintained. In response to the releasing of the meshing of the engage claw 38 with the upper gear 35 to which the seat cushion 11 and the seat back 12 have been fixed in the engaged manner, the seat S can be turned about the axis of the second shafts 22, while maintaining the relative positions of the seat cushion 11 and the seat back 12 constant.

To fix the seat cushion 11 to the upper gear 35 in the engaged manner, a third lock mechanism 40 is mounted on the frame 24 of the seat cushion 11 and includes an engage claw 41 which is operated between a position in which it is meshed with the upper gear 35 and a position in which it is disengaged from the upper gear 35. Accommodated in the seat cushion 11 are a lever 42 for operating the third lock mechanism 40, and most of a belt 43 connected to the lever 42. An operating ring 44 is secured to that end of the belt 43 which protrudes from a front surface 11a of the seat cushion 11. Moreover, in the third lock mechanism 40, the engage claw 41 is biased by a spring in the direction of meshing with the upper gear 35, and when the third lock mechanism 40 is driven through the lever 42 by traction of the belt 43 from the operating ring 44, the engage claw 41 is moved in a direction of disengagement from with the upper gear 35 against the biasing force of the spring. In this state, the seat cushion 11 can be turned about the axis of the second shaft 22. When an occupant releases his hand from the operating ring 44, the engage claw 41 is moved in the direction of meshing with the upper gear 35 by the biasing force of the spring, thereby causing the seat cushion 11 to be fixed to the upper gear 35 in the engaged manner.

To fix the seat back 12 to the upper gear 35 in the engaged manner, a fourth lock mechanism 45 is mounted on the frame 23 of the seat back 12 and includes an engage claw 46 which is operated between a position in which it is meshed with the upper gear 35 and a position in which it is disengaged from the upper gear 35. Accommodated in the seat back 12 are a lever 47 for operating the fourth lock mechanism 45, and most of a belt 48 connected to the lever 47. An operating ring 49 is secured to that end of the belt 48 which protrudes from a front surface 12a of the seat back 12. Moreover, in the fourth lock mechanism 45, the engage claw 46 is biased by a spring in a direction of meshing with the upper gear 35, and when the fourth lock mechanism 45 is driven through the lever 47 by traction of the belt 48 from the operating ring 49, the engage claw 46 is moved in a direction of disengagement from the upper gear 35 against the biasing force of the spring. In this state, the seat back 12 can be turned about the axis of the second shaft 22. When an occupant releases his hand from the operating ring 49, the engage claw 46 is moved in the direction of meshing with the upper gear 35 by the biasing force of the spring, thereby causing the seat back 12 to be fixed to the upper gear 35 in the engaged manner.

With such a seat system, the reclining, turning, height-adjustment and parallel-displacement of the seat S can be easily performed, as shown in FIG. 3. More specifically, the seat cushion 11 and the seat back 12 can be independently turned about the axes of the second shafts 22 by operation of the operating rings 44 and 49, so that they can be brought into connected orientations for seating an occupant, or brought into reclining orientations connected on the same plane, as shown in FIG. 3A. The two front and rear surfaces 11a, 12a; 11b, 12b of the seat cushion 11 and the seat back 12 can be effectively utilized by turning the seat cushion 11 and the seat back 12 in the reclining orientations connected in the same plane about the axes of the second shafts 22, as shown in FIG. 3B. Moreover, the seat cushion 11 and the seat back 12 can be simultaneously turned about the axes of the second shafts 22 to easily perform the orientation changing operation. In addition, as shown in FIG. 3C, the height position of the seat S can be adjusted by tilting the seat supporting frame $16_1$ about the axis of the first shaft 18, thereby realizing the full-flat state of the seat S in close proximity to the floor surface 14 and providing a seating orientation of the seat S which is adapted for the physique of an occupant. Further, as shown in FIG. 3D, the position of the seat S in the longitudinal direction of the vehicle can be set at any position by moving the slide members $17_1$ and $17_2$ longitudinally, and the seat S can be moved to ensure a relatively large unoccupied space within the vehicle passenger compartment 13.

Figure 4A:
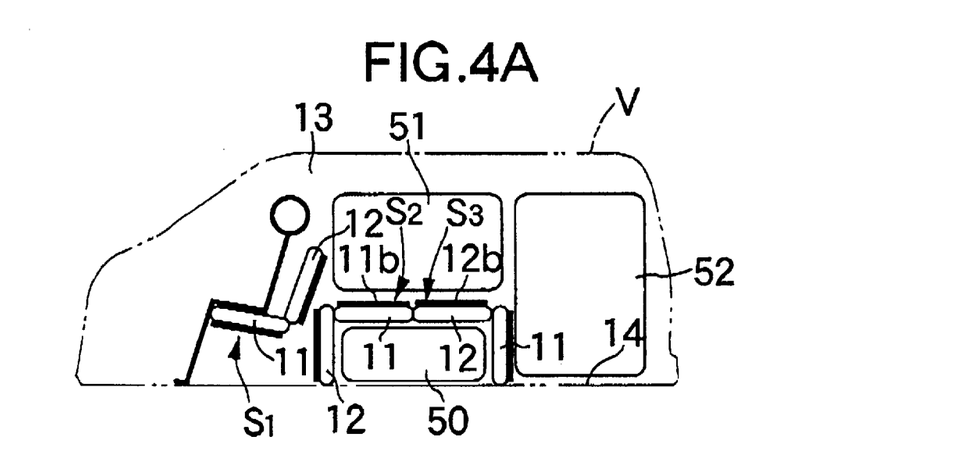
FIGS. 4A–4C are illustrations showing examples of the configuration of the seat in a box-type vehicle.
Figure 4B:
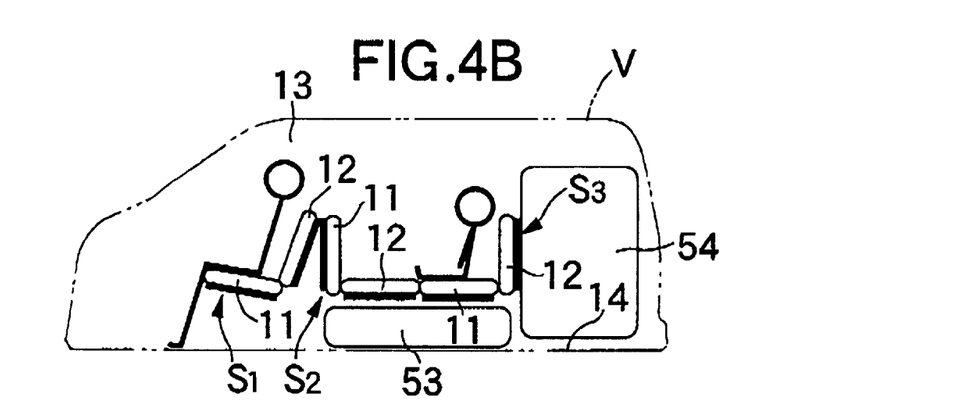
Figure 4C:
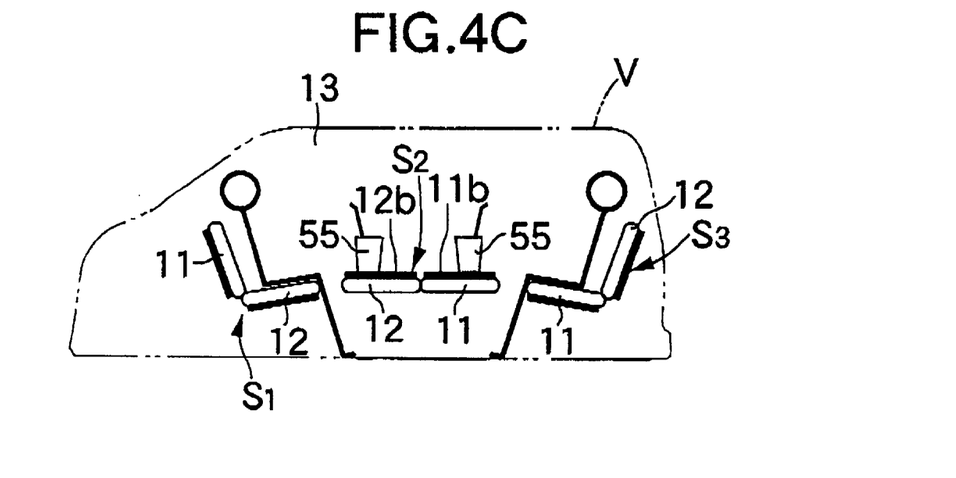

The example of configuration of the seat S when being applied to a box-type vehicle, such as a van, will be described with reference to FIGS. 4 to 7. Referring first to FIG. 4, seats $S_1$, $S_2$ and $S_3$ of first, second and third rows are disposed within a passenger compartment 13 of a box-type vehicle V. The seat $S_2$ of the second row with the seat back 12 brought into a substantially vertical orientation and the seat cushion 11 brought into a substantially horizontal orientation to extend backwards, is moved forwards, and the seat $S_3$ of the third row with the seat cushion 11 brought into a substantially vertical orientation and the seat back 12 brought into a substantially horizontal orientation to extend forwards, is moved forwards, as shown in FIG. 4A. A piece of baggage 50 can be carried in a space created above the floor surface 14 in such a manner that it is surrounded by the seats $S_2$ and $S_2$ of the second and third rows; a piece of baggage 51 can be carried on the rear surface 11b of the seat cushion 11 in the seat $S_2$ of the second row and the rear surface 12b of the seat back 12 in the seat $S_3$ of the third row;

and a piece of baggage 52 can be carried in a space created above the floor surface 14 to the rear of the seat $S_3$ of the third row. In this case, each of the rear surface 11b of the seat cushion 11 and the rear surface 12b of the seat back 12 on which the piece of baggage 51 has been carried are formed of a flat plate material and hence, the piece of baggage 51 can be stably carried on these rear surfaces 11b and 12b. The space in which the piece of baggage 50 has been carried is surrounded by the seats $S_2$ and $S_3$ and hence, is an area suitable for carrying a piece of baggage 50 which is liable to be broken.

When the seat $S_2$ of the second row is brought into an opposite seating orientation relative to the seat $S_3$ of the third row, and the seat $S_3$ of the third row is moved forwards until it contacts the seat $S_2$ of the second row, as shown in FIG. 4B, the seats $S_2$ and $S_3$ of the second and third rows can be used to allow children to play thereon or can be used as a child's bed. In this case, a piece of baggage 53 can be placed in a space created above the floor surface 14 below the seat $S_2$ and $S_3$, and a piece of baggage 54 can be placed in a space created above the floor surface 14 in rear of the seat $S_3$ of the third row by the forward movement of the latter.

Further, when the seat $S_1$ of the first row is brought into a rearward-turned seating orientation and the seat $S_2$ of the second row is brought into an orientation such that the rear surfaces 11b and 12b of the seat cushion 11 and the seat back 12 are turned upwards and substantially horizontal, as shown in FIG. 4C, the rear surfaces 11b and 12b of the seat $S_2$ of the second row can be used as a table for occupants on the seats $S_1$ and $S_3$ of the first and third rows. In this case, cups 55 for drinks and the like can be stably placed on the table due to the fact that each of the rear surfaces 11b and 12b is formed of the flat plate material.

Figure 5A:
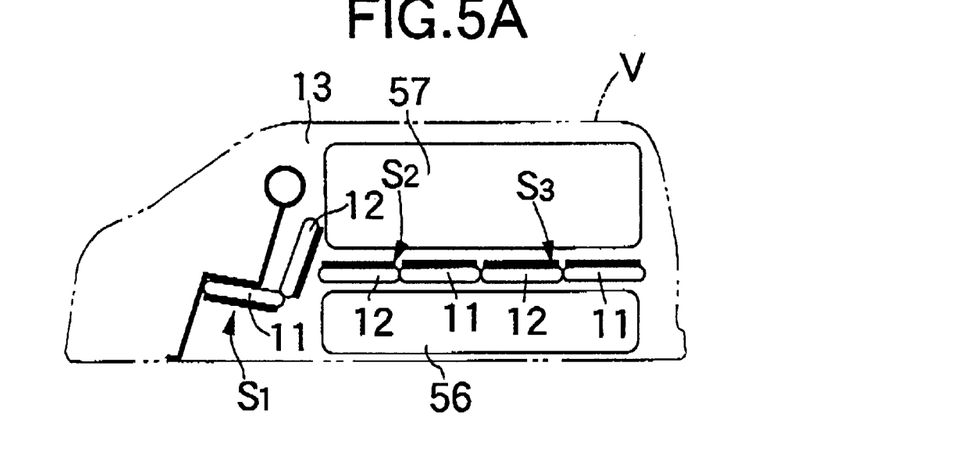
FIGS. 5A–5C are illustrations showing other examples of the configuration of the seat in a box-type vehicle.

An example when the seats $S_1$, $S_2$ and $S_3$ have been selectively brought into full-flat states will be described with reference to FIG. 5. When the seats $S_2$ and $S_3$ of the second and third rows are brought into orientations such that the rear surfaces 11b and 12b of the seat cushions 11 and the seat backs 12 are turned upwards and substantially horizontal at a relatively high level, as shown in FIG. 5A, a piece of baggage 56 can be placed in a space created above the floor surface 14 below the seats $S_2$ and $S_3$ of the second and third rows, and a piece of baggage 57 can be stably placed on a relative wide deck created by the interconnection of the rear surfaces 11b and 12b of the seat cushions 11 and the seat backs 12 in the seats $S_2$ and $S_3$ of the second and third rows.

Figure 5B:
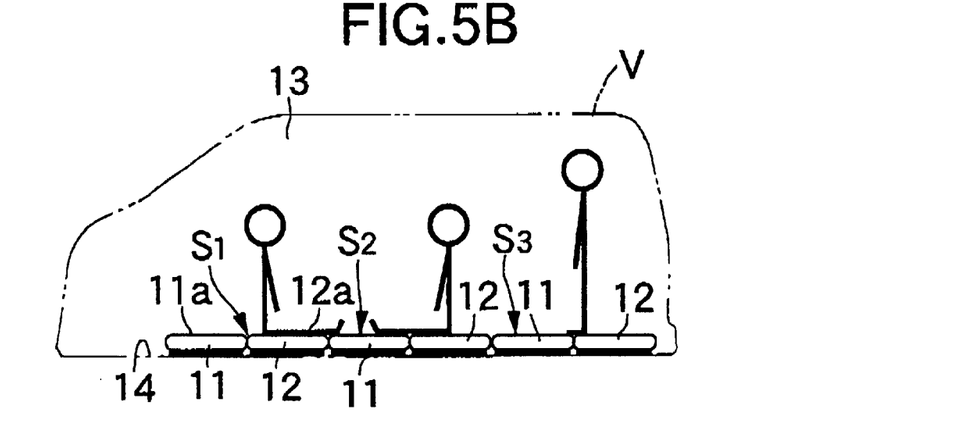

When the seats $S_1$, $S_2$ and $S_3$ of all the rows are brought into full-flat orientations with their front surfaces 11a and 12a turned upwards and the levels of the seats $S_1$, $S_2$ and $S_3$ are lowered until they come into proximity to the floor surface 14, as shown in FIG. 5B, a bed can be achieved over a relatively wide region in close proximity to the floor surface 14.

Figure 5C:
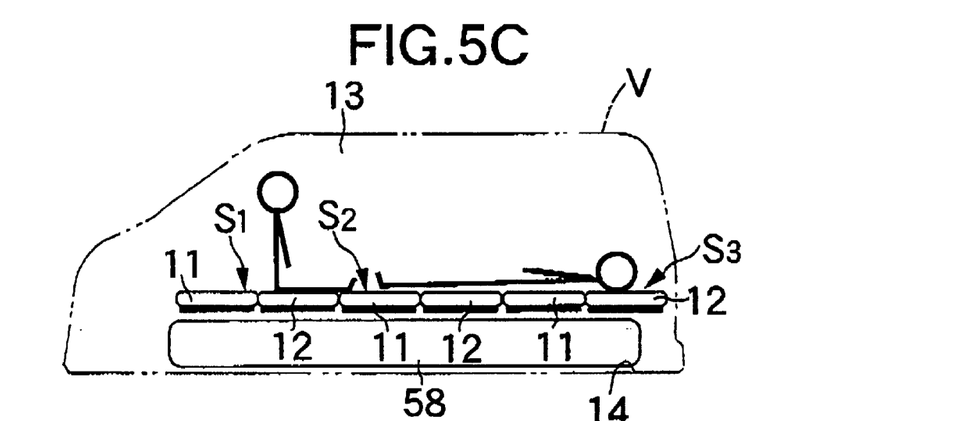

Further, when the seats $S_1$, $S_2$ and $S_3$ of all the rows are brought into full-flat orientations with their front surfaces 11a and 12a turned upwards and the levels of the seats $S_1$, $S_2$ and $S_3$ are maintained at a relatively high location spaced apart from the floor surface 14, as shown in FIG. 5C, a bed can be achieved over a relatively wide region, and a piece of baggage 58 can be placed in a space created above the floor surface 14 and below the seats $S_1$, $S_2$ and $S_3$.

Figure 6A:
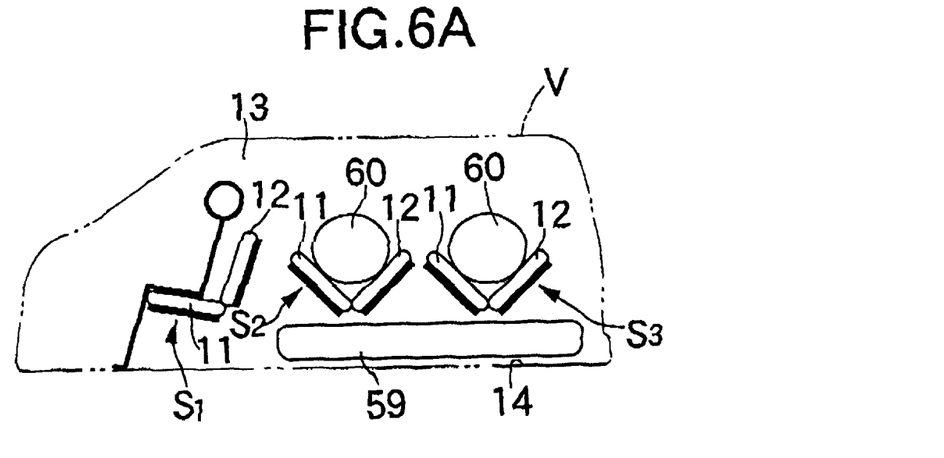
FIGS. 6A–6C are illustrations showing further examples of the configuration of the seat in a box-type vehicle.

FIG. 6 shows an example in which the seats $S_2$ and $S_3$ of the second and third rows are effectively used to carry various pieces of baggage. When the orientations of the seats $S_2$ and $S_3$ of the second and third rows are determined so that the seat cushion 11 and the seat back 12 are disposed to form a substantially V-shape which opens upwards, and the positions of the seats $S_2$ and $S_3$ are maintained at a relatively high level, a relatively long piece of baggage can be carried in a space created above the floor surface 14 and below the sheets $S_2$ and $S_3$, and pieces of baggage 60, 60 which are liable to rotate in a planar surface can be stably carried on the seats $S_2$ and $S_3$, as shown in FIG. 6A.

Figure 6B:
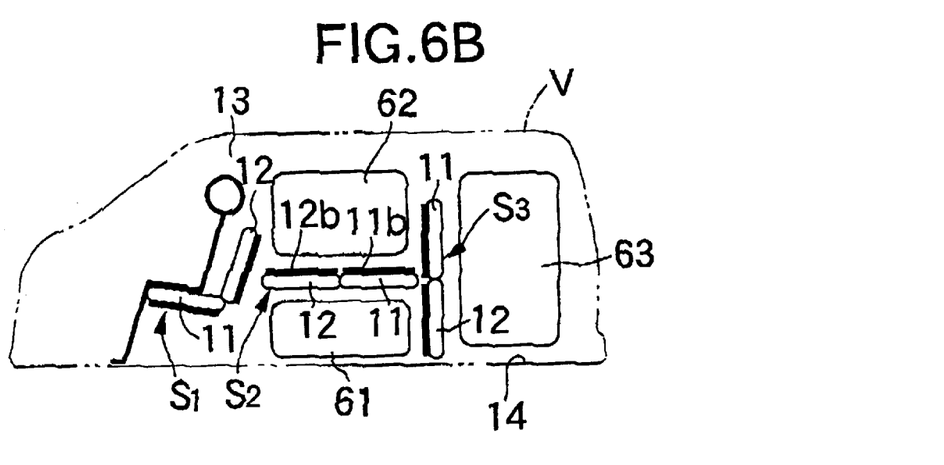

When the orientation of the seat $S_2$ of the second row is determined so that the rear surfaces 11b and 12b of the seat cushion 11 and the seat back 12 are turned upwards and substantially horizontal, and the seat $S_3$ of the third row brought into an orientation with the seat cushion 11 and the seat back 12 connected to each other in a substantially vertical direction is moved forwards, a piece of baggage 61 can be carried in a space created above the floor surface 14 and below the seat $S_2$ of the second row; a piece of baggage 62 can be stably carried on the rear surfaces 11b and 12b of the seat $S_2$ of the second row, and moreover, a piece of baggage 63 can be carried in a space created above the floor surface 14 in rear of the seat $S_3$ of the third row by the forward movement of the latter, as shown in FIG. 6B.

Figure 6C:
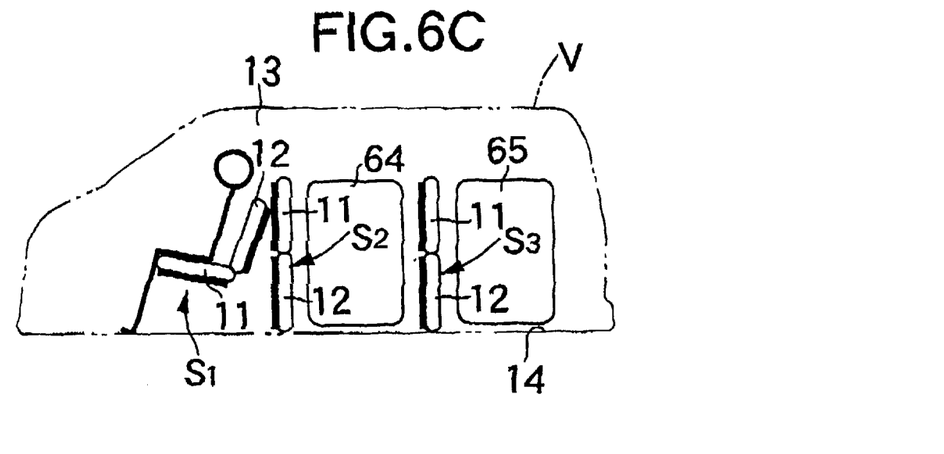

Further, when the seats $S_2$ and $S_3$ of the second and third rows are brought into orientations with the seat cushions 11 and the seat backs 12 connected to each other in a substantially vertical direction and are moved forwards in such a manner that they are spaced from each other, a piece of baggage 64 can be carried in a space created above the floor surface 14 between the seats $S_2$ and $S_3$ of the second and third rows, and a piece of baggage 65 can be carried in a space created above the floor surface 14 in rear of the seat $S_3$ of the third row, as shown in FIG. 6C.

FIG. 7 shows an example in which the seats $S_1$, $S_2$ and $S_3$ are effectively used to ensure a relatively wide unoccupied space within the vehicle passenger compartment 13. When the seat $S_1$ of the first row is lowered to a position in which the seat cushion 11 and the seat back 12 are folded in an opposed relation to each other to come into proximity to the floor surface 14, and the seats $S_2$ and $S_3$ of the second and third rows are moved to a rearmost place in the vehicle passenger compartment 13 in an orientation with the seat cushion 11 and the seat back 12 connected to each other in a substantially vertical direction, a relatively wide unoccupied space can be ensured within the compartment 13, as shown in FIG. 7A.

Figure 7A:
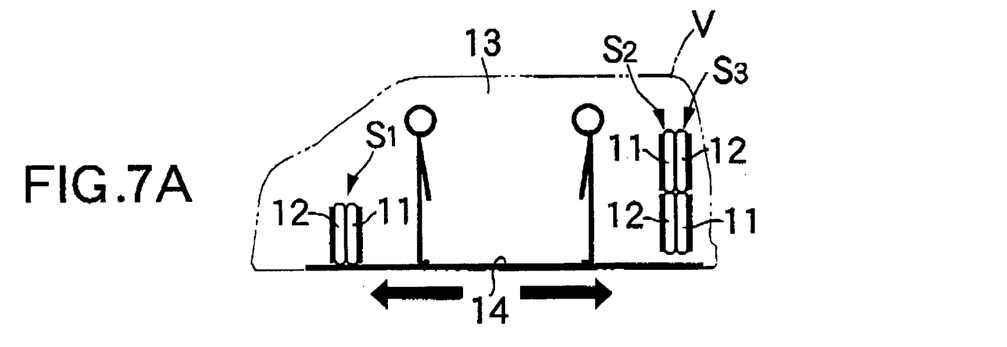
FIGS. 7A–7D are illustrations showing yet further examples of the configurations of the seat in to a box-type vehicle.
Figure 7B:
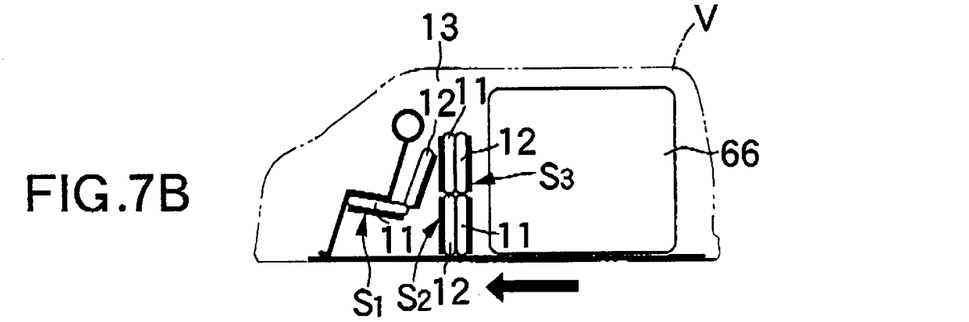

When the seats $S_2$ and $S_3$ of the second and third rows are brought into orientations with the seat cushion 11 and the seat back 12 connected to each other in a substantially vertical direction, and are moved forwards until they are in proximity to the seat $S_1$ of the first row, a relatively wide unoccupied space can be ensured in rear of the seat $S_3$ of the third row, and a relatively large piece of baggage 66 can be carried on floor surface 14 in the unoccupied space, as shown in FIG. 7B.

Figure 7C:
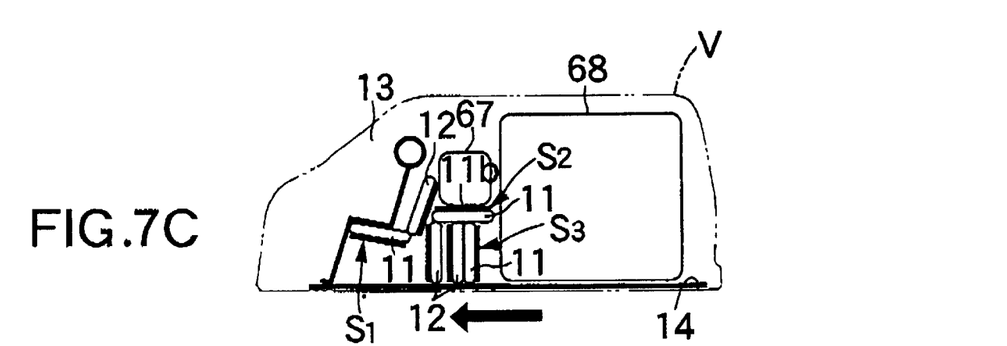

When the seat $S_2$ of the second row with the seat back 12 being in a substantially vertical orientation and with the seat cushion 11 being in a substantially horizontal orientation and extending rearwards and the seat $S_3$ of the third row with the seat cushion 11 and the seat back 12 folded so as to become opposed to each other are moved forwards in such a manner that the seat $S_3$ is accommodated below the seat $S_2$ until they are in proximity to the seat $S_1$ of the first row, a relatively small piece of baggage 67 can be stably carried on the upward-directed rear surface 11b of the seat $S_2$ of the second row, and a relatively large piece of baggage 68 can be carried in a relatively large space created above the floor surface 14 in rear of the seats $S_2$ and $S_3$ of the second and third rows, as shown in FIG. 7C.

Figure 7D:
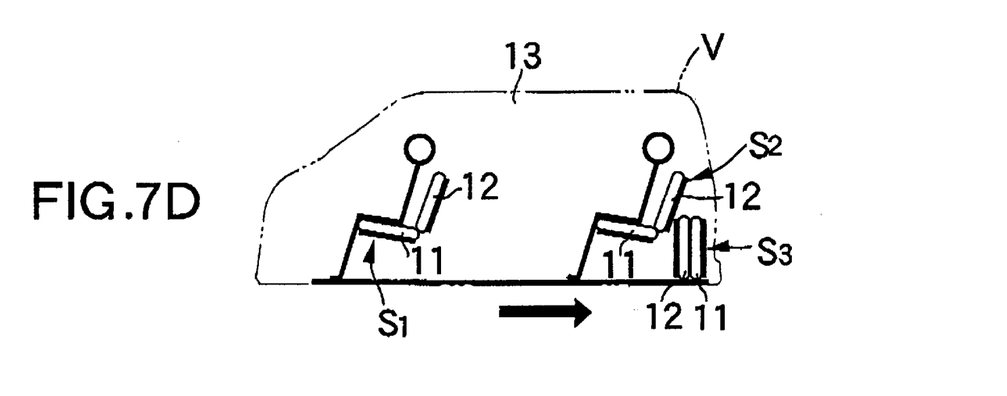

When the seat $S_3$ of the third row with the seat cushion 11 and the seat back 12 folded to become opposed to each other and lowered, is moved to a rearmost location in the vehicle passenger compartment 13, and the seat $S_2$ of the second row in a forward-directed seating orientation is moved rearwards until it is in proximity to the seat $S_3$ of the third row, a relatively wide unoccupied space can be ensured between the seats $S_1$ and $S_2$ of the first and second rows, and an occupant can sit on the seat $S_2$ of the second row with an allowance, as shown in FIG. 7D.

Figure 8:
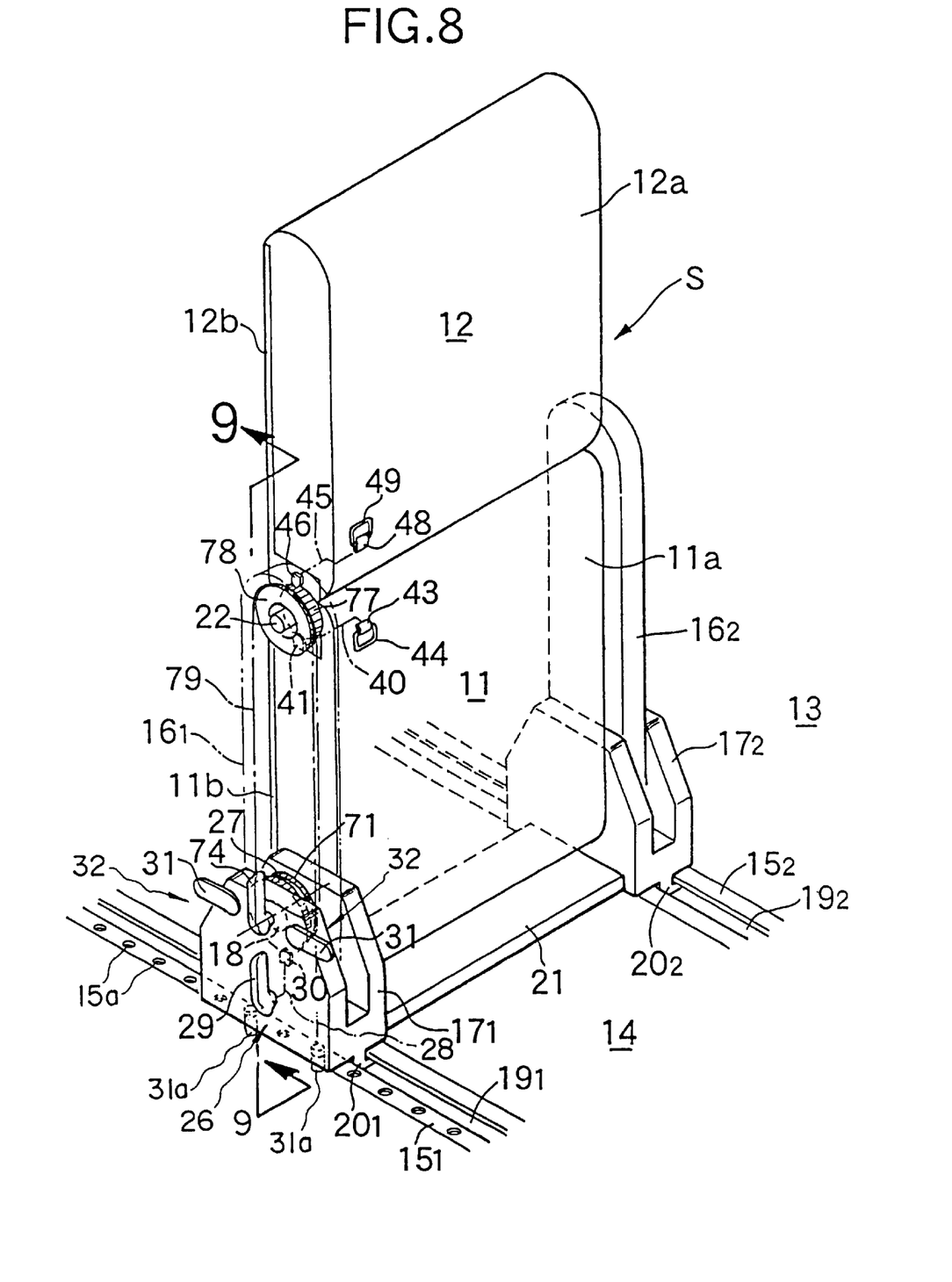
FIG. 8 is a perspective view of a seat system for a vehicle according to a second embodiment of the present invention.
Figure 9:
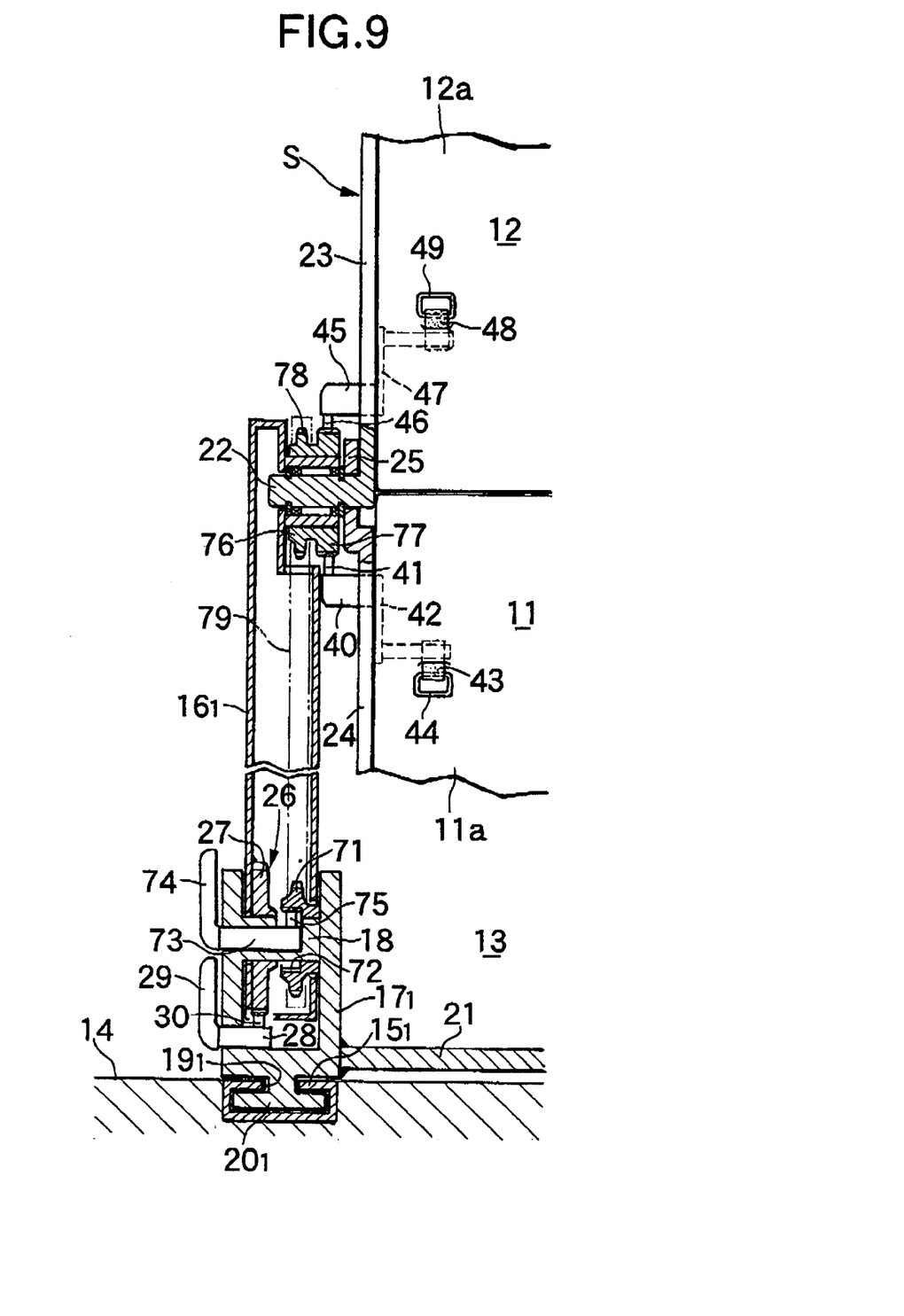
FIG. 9 is a sectional view taken along a line 9—9 in FIG. 8.

FIGS. 8 and 9 illustrate a second embodiment of the present invention. FIG. 8 is a perspective view of a seat system for a vehicle, and FIG. 9 is a sectional view taken along a line 9—9 in FIG. 8.

In the description of the second embodiment, the detailed description of the same construction as in the first embodiment is omitted, and portions or components corresponding to those in the first embodiment are designated by like reference characters but are not described.

A pair of seat supporting frames $16_1$ and $16_2$ disposed on opposite sides of a seat S, are tiltably connected at one end thereof to slide members $17_1$ and $17_2$ through first shafts 18. A seat cushion 11 and a seat back 12 of the seat S is relatively turnably supported at the other ends of the seat supporting frames $16_1$ and $16_2$ through second shafts 22.

In one of the slide members $17_1$, a first sprocket 71 is carried on the first shaft 18 as a first rotary wheel can be turned about the axis of the first shaft 18 and fixed to the slide members $17_1$. An inner gear 72 is provided around an inner periphery of the first sprocket 71, and a fifth lock mechanism 73 is mounted on the first shaft 18 of the slide member $17_1$ so that it can be meshed with and disengaged from the inner gear 72. The fifth lock mechanism 73 is fitted into and fixed in the slide member $17_1$ coaxially with the first shaft 18, and includes an operating lever 74 disposed outside the seat supporting frame $16_1$, and an engage claw 75 which is operated in response to the turning operation of the operating lever 74 between a position in which it is meshed with the inner gear 72 and a position in which it is disengaged from the inner gear 72. The engage claw 75 protrudes from an outer periphery of the first shaft 18 in order to be meshed with the inner gear 72.

Thus, in a state in which the engage claw 75 of the fifth lock mechanism 73 is not meshed with the inner gear 72, the first sprocket 71 can be raced about the first shaft 18, and by meshing of the engage claw 75 with the inner gear 72, the first sprocket 71 is fixed to the first shaft 18 and thus to the slide member $17_1$. A second rotary wheel 76 is supported at the other end of the supporting frame $16_1$ and is turnable about the axis of the second shaft 22, and a gear 77 and a second sprocket 78 are integrally provided on the second rotary wheel 76. As to the upper gear 35 in the first embodiment, the seat cushion 11 can be fixed in an engaged manner to the gear 77 through a third lock mechanism 40, and the seat back 12 can be fixed in an engaged manner to the gear 77 through a fourth lock mechanism 45. Further, a chain 79 which is an endless transmitting band, is reeved around the second sprocket 78 and the first sprocket 71 is turnable about the first shaft 18.

With the second embodiment, when the first sprocket 71 is not fixed to the slide member $17_1$ and can be raced about the first shaft 18, the second rotary wheel 76 provided with the second sprocket 78 connected to the first sprocket 71 through the chain 79 can be turned about the axis of the second shaft 22 and therefore, the seat cushion 11 and the seat back 12 fixed in the engaged manner to the gear 77 provided on the second rotary wheel 76, can be turned about the axis of the second shaft 22 with the relative positions of seat cushion 11 and seat back 12 left constant. When the first sprocket 71 has been fixed to the slide member $17_1$, and the seat supporting frame $16_1$ is tilted about the axis of the first shaft 18, the second sprocket 78 is rotated through the chain 79 reeved around the first sprocket 71. Therefore, when the seat cushion 11 and the seat back 12 have been fixed in the engaged manner to the gear 77 provided on the second rotary wheel 76, the seat cushion 11 and the seat back 12 are turned about the axis of the second shaft 22 with the relative positions of seat cushion 11 and seat back 12 left constant. In adjusting the height of the seat S by tilting the seat supporting frame $16_1$, the height of the seat S is changed with its orientation relative to the floor surface 14, maintained constant. Thus, it is easy to perform the operation for adjusting the height.

In place of the first and second sprockets 71 and 72, pulleys may be employed, and a belt which is an endless transmitting band may be reeved around the pulleys.

As discussed above, the position of the seat in the longitudinal direction within the vehicle passenger compartment can be set at any point. In addition, the height position of the seat can be adjusted by tilting the seat supporting frames about the axis of the first shaft, whereby the seat can be brought into a seating orientation adapted for the physique of an occupant. Further, by turning the seat cushion and the seat back about the axis of the second shaft relative to each other, the two front and rear surfaces of the seat cushion and the seat back can be effectively utilized, and the seat can be moved to ensure a relatively wide unoccupied space within the compartment. By combining this movement with the tilting of the seat supporting frames, the seat can be brought into a full-flat state in close proximity to the floor surface. In this manner, the seat can be adjusted to any height and adapted for multipurposes.

The adjustment of the height position of the seat by the tilting movement of the seat supporting frames, can be easily performed by the supporting frame tilted-position adjusting means. In addition, the orientation of the seat can be 6hanged with the relative positions of the seat cushion and the seat back maintained constant, by the seat position adjusting means. For example, the orientation of the seat can be easily changed from the forward-turned state to the opposite seating orientation.

The slide members, i.e., the seat supporting frames can be smoothly moved along the guide rails.

The rear surface of the seat can be effectively utilized for a purpose other than the seating, for example, as a table or the like.

Even if the seat can be brought into the opposite seating orientation, an occupant can sit on the seat without a sense of incompatibility, and the seat can be effectively utilized as a full-flat bed or table.

The orientation of the seat relative to the floor surface can be maintained constant during tilting movement of the seat supporting frames, and the adjustment of the height of the seat can be performed while maintaining the orientation of the seat relative to the floor surface, wherein adjustment of the height is an easy operation.

Although the embodiments of the present invention have been described in detail, it will be understood that the present invention is not limited to the above-described embodiments, and various modifications in design may be made without departing from the spirit and scope of the invention defined in claims.

We claim:

1. A seat system for a vehicle, said seat system comprising a seat having a seat cushion and a seat back, said seat adapted to be disposed within a passenger compartment in a vehicle, said seat system further including guide rails adapted to be mounted on a floor surface within the vehicle passenger compartment, a pair of seat supporting frames disposed on opposite sides of said seat, a pair of slide members, a first shaft for interconnecting said seat supporting frames and said slide members, and second shaft parallel to said first shaft for interconnecting said seat and said seat supporting frames, said pair of seat supporting frames being connected at one end thereof to said pair of slide members, such that said pair of seat supporting frames can be tilted around said first shaft and fixed in any tilted positions, said slide members being movable along said guide rails and fixable at any position along said guide rails, said seat cushion and said seat back being supported at the other ends of said seat supporting frames, such that said seat cushion and said seat back are turnable relative to each other at a pivot point defined by said second shaft and are fixable in any relative turned positions.

2. The seat system for a vehicle according to claim 1, further including a supporting frame tilted-position adjusting means coupled between one end of one of said seat supporting frames and one of said slide members for adjustably fixing the tilted position of said one seat supporting frame about an axis of said first shaft, and a seat turned-position adjusting means coupled to the other end of said one seat supporting frame for adjustably fixing the turned position of said seat with the relative positions of said seat cushion and said seat back maintained constant, about an axis of said second shaft.

3. The seat system for a vehicle according to claim 1 or 2, wherein said pair of slide members are integrally connected to each other through a connection member.

4. The seat system for a vehicle according to claim 1 or 2, wherein front and rear surfaces of each of said seat cushion and said seat back are formed of different materials.

5. The seat system for a vehicle according to claim 4, wherein one surface of the seat cushion is configured to form a table top.

6. The seat system according to claim 4, wherein one surface of the seat cushion includes cup holders.

7. The seat system for a vehicle according to claim 1 or 2, wherein said seat cushion and said seat back have substantially the same structure and shape.

* * * * *